UNITED STATES PATENT OFFICE 2,166,467

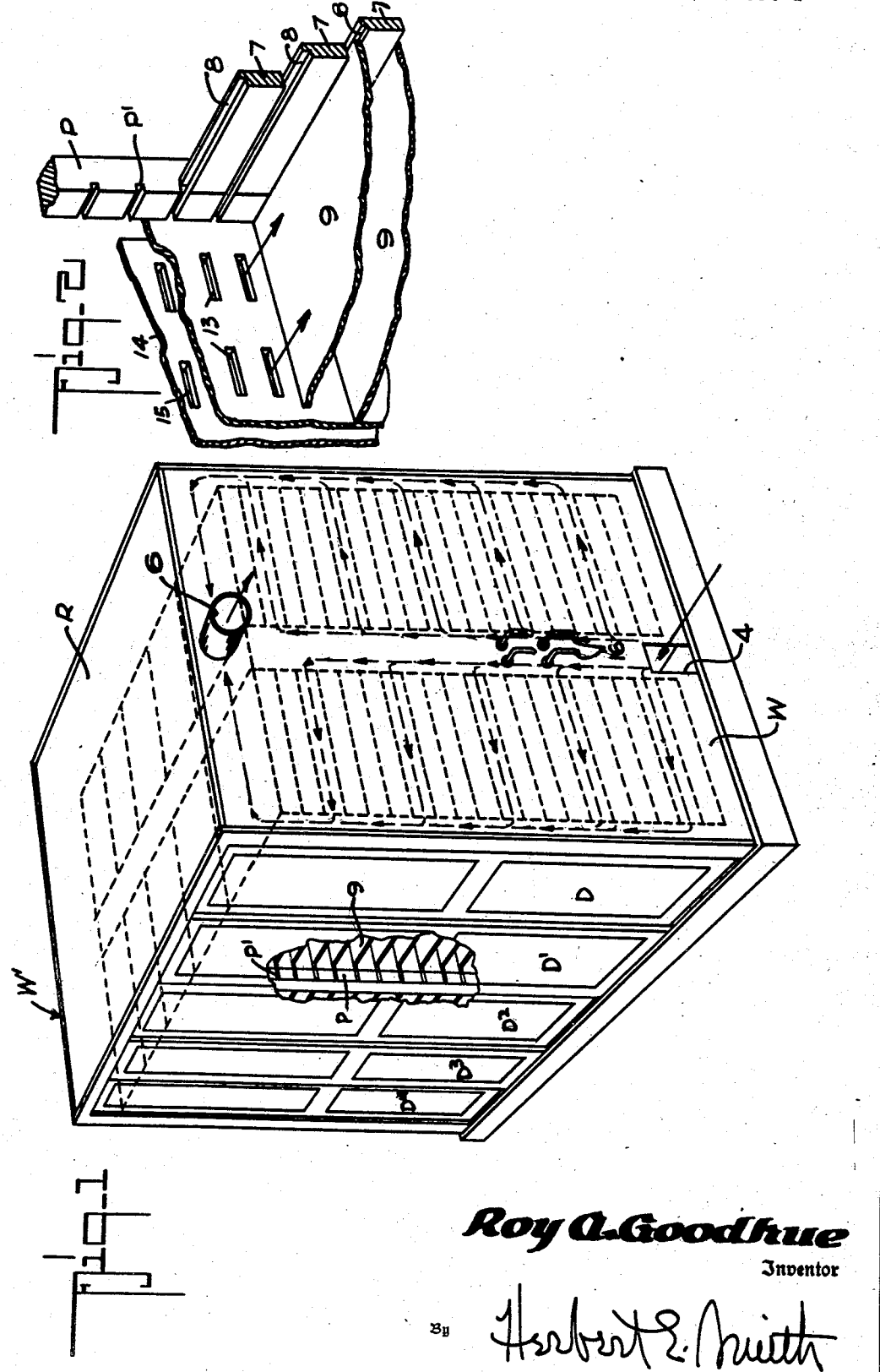

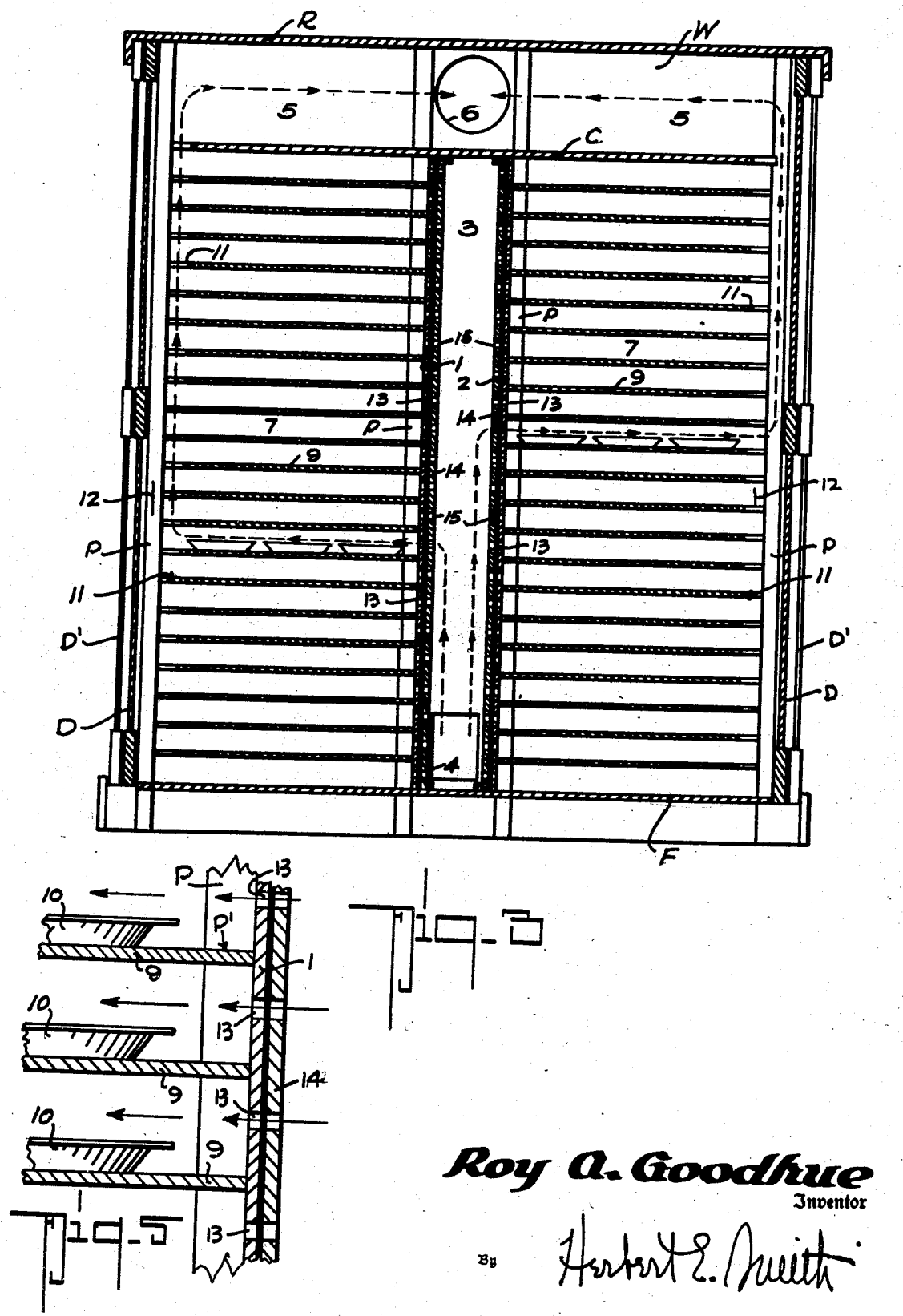

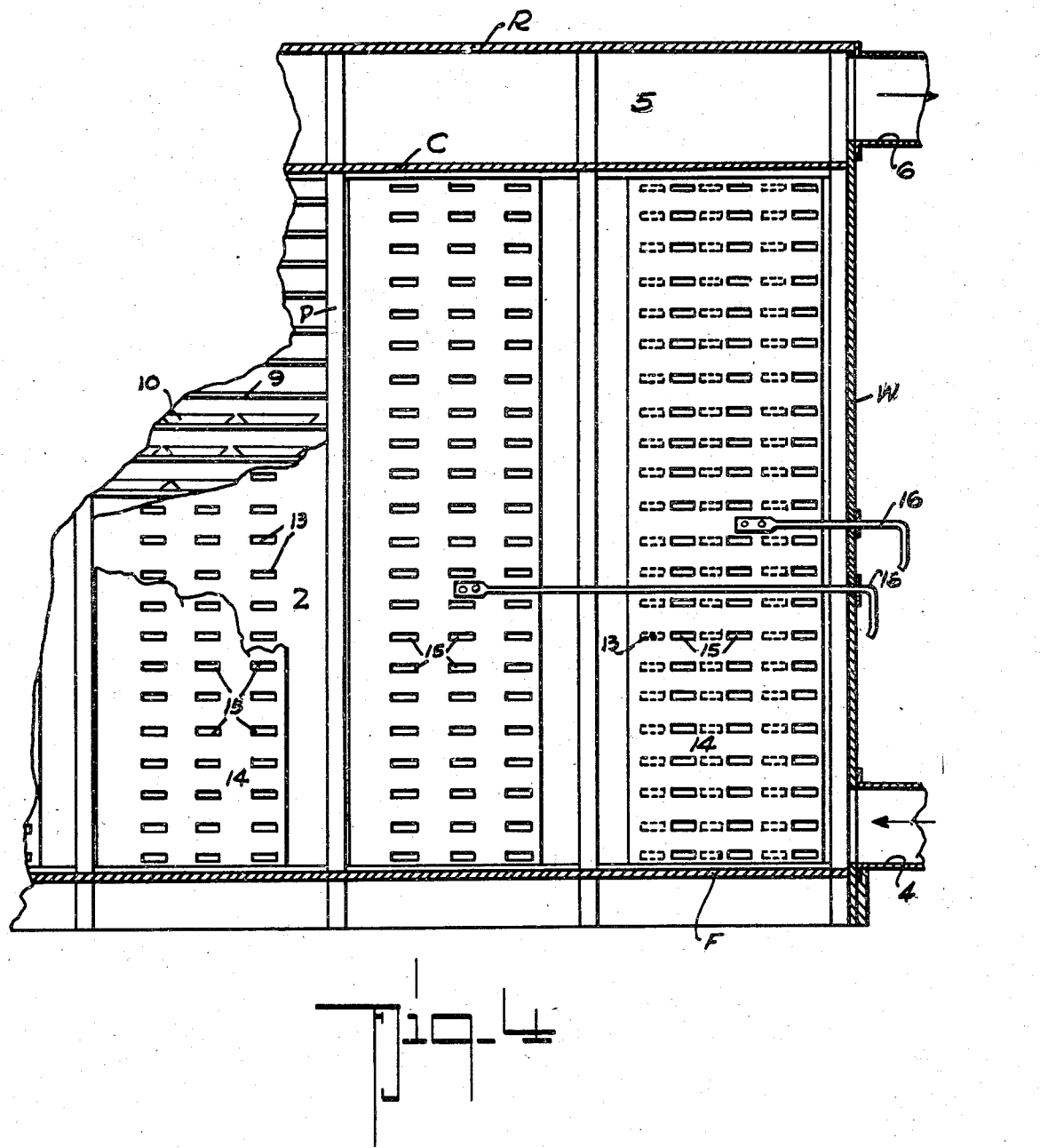

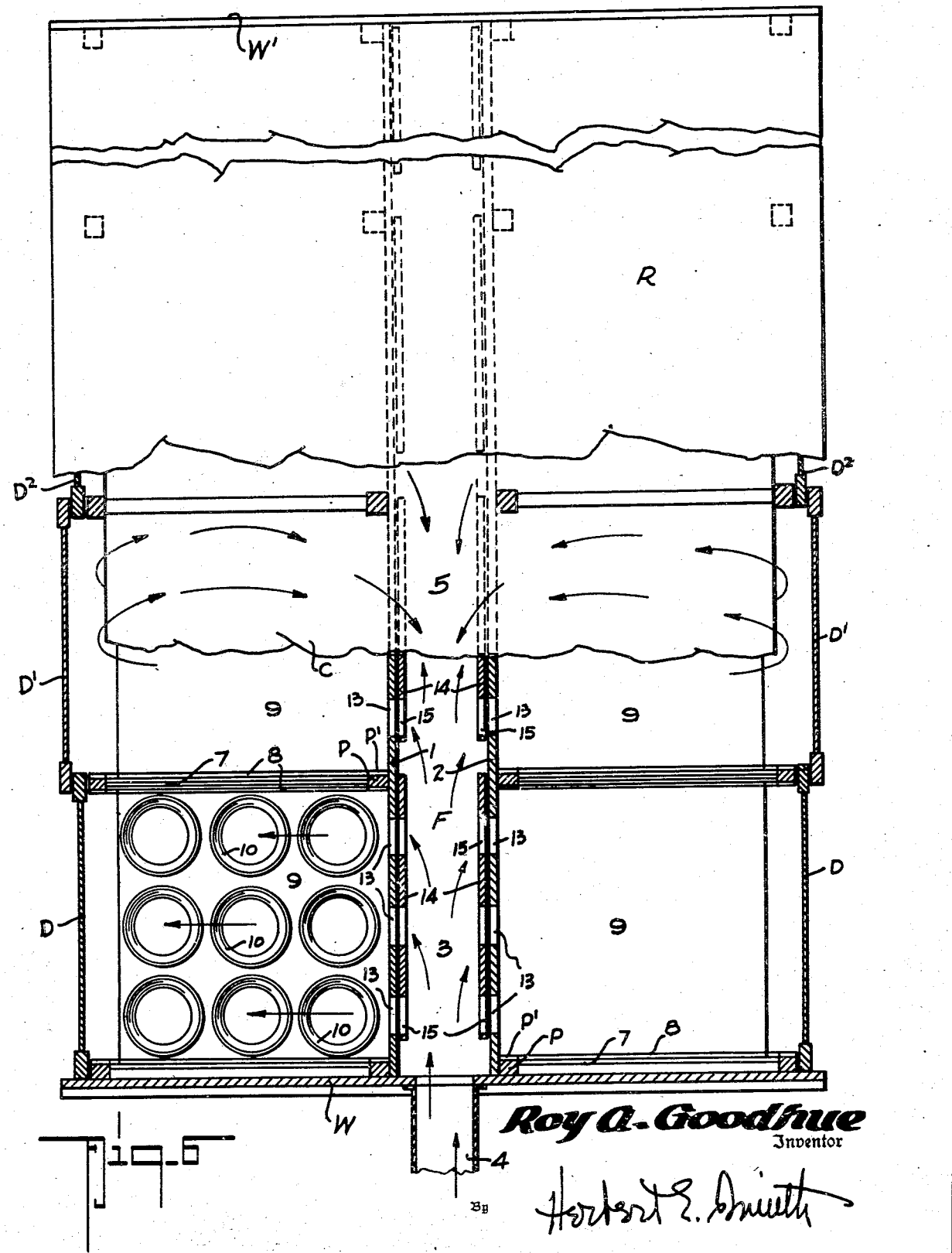

EGG DEHYDRATOR

Roy A. Goodhue, Spokane, Wash.

Application February 7, 1938, Serial No. 189,182

2 Claims. (Cl. 34—39)

My present invention relates to an improved egg dehydrator or dehydration plant, which, while adapted for various uses, is particularly designed for the preservation of foods and food products, by means of evaporation. In the adaptation of my invention to the preservation of eggs in large quantities, I first separate the yolks or yellow substance from the whites or albumen of the eggs, and the separated yolks are treated in suitable manner as desired. The present invention pertains to the evaporation of moisture from the liquid albumen, in large quantities, and the dehydrated food product is fashioned from the liquid albumen in the form or shape of thin cakes. The removal of the moisture from the liquid albumen, by evaporation, is accomplished in an enclosure or drying-house, by the circulation of air currents which, preferably are heated, and by the use of my invention, the drying-house is equipped to dehydrate a large quantity of the liquid albumen in a comparatively short time, and produce a food-product of uniformly high standard or quality.

As is well known to those familiar with the process of preserving liquid albumen by dehydration, the liquid albumen is susceptible to deterioration or fermentation if exposed to the atmosphere for a considerable length of time. Many attempts which have been made to dehydrate large quantities of liquid albumen, have failed to produce a high-grade product, due to the fact that a uniform temperature and a uniform volume of air could not be applied to the mass quantity of liquid albumen for evaporation purposes. Under these conditions some portions of the mass of liquid albumen has been properly treated to produce the proper preservation, while other portions of the mass treated would fail to receive the proper treatment and therefore result in a low-grade product.

In carrying out my invention, the bulk or mass quantity of the liquid albumen is divided into small, thin, portions, and these small portions are separately subjected to evaporation, by air currents having an equalized degree of temperature, and a uniform flow as to the volume of air in the currents. Means are provided whereby a substantially uniform temperature and volume of air is equally distributed throughout the entire interior of the drying-house to effect a standard high-grade quality in the dehydrated product, and to produce the product in a minimum period of time. The liquid albumen, in small quantities or portions, is deposited in shallow pans that are enclosed in the drying-house, and the contents of all of the pans are subjected to a uniform treatment to insure a uniformly high-grade quality in the dehydrated cakes produced in the pans.

The invention consists in certain novel combinations and arrangements of parts within the drying-house as will hereinafter be more fully set forth and claimed. In the accompanying drawings I have illustrated one complete example of the physical embodiment of my invention wherein the parts are combined and arranged according to one mode I have thus far devised for the practical application of the principles of my invention. It will be understood, however that changes and alterations may be made in the exemplifying structures, within the scope of my appended claims, without departing from the principles of the invention.

Figure 1 is a perspective view, partly broken away, of the drying-house, showing the house with a capacity of ten compartments, and also showing the air inlet and air outlet to and from the house.

Figure 2 is a fragmentary perspective view of an interior corner construction of the house, disclosing the slide trays or shelves and ported partitions for circulation of air currents.

Figure 3 is a transverse, vertical, sectional view through the house, looking toward the front, and showing the central longitudinally extending main flue with its inlet and outlet and two of the laterally spaced compartments with their updraft flues opening to the upper outlet chamber of the house.

Figure 4 is a partial longitudinal, vertical section view of the house, showing the interior, ported, control slides or partitions in the main flue, the first slide or the slide at the right being closed, and the other two slides being shown in open position.

Figure 5 is an enlarged detail fragmentary view showing some of the slide trays and evaporating pans, and the ported controls for the evaporating compartments.

Figure 6 is a top plan view partly in horizontal section, showing the interior arrangement of the compartments, the main flue, and the current controls.

In the illustrated drying house I provide an enclosure having the front wall W and rear wall W', the roof R and floor F, and at each side of the house I provide a suitable number of sliding doors here shown as five in number, and designated D, D', D2 and D3 and D4. The sliding doors, which move horizontally, are of any suitable type to produce air tight side walls for the house, and each of the ten doors may be opened from the exterior to gain access to a compartment. The capacity of the drying-house may be increased or decreased by varying the number of compartments, but preferably the compartments are arranged in spaced pairs at opposite sides of the longitudinal center of the house.

Along the longitudinal center of the house are erected two spaced vertical partitions 1 and 2 extending from the floor F to a ceiling C, and these two partitions, which form the inner lateral walls of the compartments, also form a central longitudinally extending main or distributing flue for heated air, the flue being indicated as a whole by the numeral 3. Heated air from a suitable source is introduced under pressure into the flue through an air inlet 4 at the front lower portion of the house, and the air is exhausted from the upper outlet chamber 5 between the roof R and the ceiling C, through an outlet pipe or port 6.

Dividing posts or uprights P are erected in the interior of the house to divide the sides of the house into rows of compartments, and these corner posts, which support the doors and partitions, are grooved as at P' as indicated in Figure 2. The posts also support fixed rails 7 that extend transversely of the house, and these rails, which are tongued and grooved, as at 8, form the dividing walls between adjoining compartments, at opposite sides of the house.

The grooves 8 and P' of these dividing walls are adapted to receive the opposite side edges of rectangular, flat, slidable trays 9 that are arranged in each compartment, in vertical tiers, and these trays are readily accessible from the exterior of the house when one of the sliding doors as D is moved to open position.

As indicated in Figures 5 and 6 these trays are designed to support a number of flat, shallow pans as 10 in which the liquid albumen has previously been deposited from a suitable receptacle. The slide door of a compartment is opened to permit changing of a compartment, and then closed for the evaporating treatment. After a suitable period of time in which the liquid is evaporated and the residue of the albumen is converted into a dry cake, the slide door is opened, the trays removed by sliding outwardly from their compartments, and then the same trays, or additional trays, with a fresh supply of liquid albumen, are inserted into the compartment, and the door closed for a repetition of the process.

In Figures 3 and 6 particularly, it will be noted that the outer edges of the trays, as 11, terminate a considerable distance from the adjoining door, and by this arrangement of the trays in vertical tiers within their compartments, up-draft flues as 12 are provided, which flues at their upper ends open into the outlet chamber 5. The evaporating spaces between the horizontal trays, in which the pans are located, at their outer ends, all open into the up-draft flues, as indicated by the arrows in Figure 3.

For distributing the heated air currents from the central main flue into the evaporating spaces of the several compartments the two interior partitions 1 and 2 are fashioned with slots or inlet ports 13 opening from the main flue into the spaces of the compartments, and it will be apparent that the air currents are uniformly distributed from bottom to top of the flue, laterally, through the ports, into the evaporating spaces.

For controlling this lateral flow of the air currents from the main flue into the compartments, each compartment is provided with a horizontally movable slide 14. These slides are located at opposite sides of and within the flue 3, and they are ported or slotted as at 15, the ports or slots being alined with the ports 13 of the fixed partitions 1 and 2, and the ports are so related that the slide may be moved to simultaneously close the ports to a compartment or to simultaneously open the ports to a compartment. In Figure 4 the first or right hand slide is in closed position, and the other two slides are in open position. These slides are manually operated from the front of the house through the use of exterior, projecting handles 16, one attached to each of the slides, and the handles or handle bars extend through opening or holes provided therefor in the front wall of the house.

With the trays arranged in tiers in each compartment, and the pans containing the liquid albumen arranged on the trays as indicated in Figure 6, the exterior sliding doors are all closed in a substantially air tight manner, and the ported slides for controlling air currents are moved to open position as indicated in Figures 3 and 6. A forced draft is created in a suitable manner through the inlet port 4 to build up a quantity of air in the main central flue 3 which has been heated by a suitable air heater, and this resultant pressure causes the circulation of air currents throughout the house and forces the air to rise and collect in the chamber 5 from whence it is exhausted through the outlet port 6. The air currents are equally distributed through ports 15 and 13 into the evaporating spaces in the compartments between the trays, moisture is evaporated from the liquid albumen, and the moisture-laden air currents ascend through the up-draft flues to the outlet chamber, and then pass out through the outlet pipe 6.

Due to the free flow of the currents, the substantially uniform degree of temperature of all of the air currents, and the equal distribution of the currents into the several compartments and evaporating spaces of the compartments, all of the deposits of liquid albumen in the pans, are subjected to substantially the same uniform treatment to insure a high-grade quality for the dehydrated cakes of albumen.

The period of time for evaporating the liquid albumen may vary under different circumstances, but as an example, the dehydration process may proceed for approximately six hours in a drying house of the capacity illustrated, after which the sliding doors may be opened, the trays removed for the recovery of the hydrated cakes of albumen, and the compartments may again be recharged with a supply of fresh liquid albumen previously deposited in pans 10. While the sliding doors are opened, the slides 14, are preferably closed to prevent flow of heated air from the main central distributing flue, and of course, after the compartments have been re-charged, the slides are again opened to permit circulation of the heated air currents. Preferably the compartments are opened and discharged separately and successively in regular order, and of course the circulation of air currents is cut off from the open compartment, while at the same time the air currents may be circulating through the other, closed, compartments. In this manner the drying-house may operate continuously, and the successive compartments may be alternately charged and discharged by an attendant, the albumen in the several compartments being subjected to the same treatment to effect a standardized high quality in the dehydrated cake.

The shallow pans are filled with a deposit of liquid albumen to approximately a depth of half an inch, and as the house and trays are of substantial construction to insure leveling of the trays and pans, the contents of each pan throughout its area is of uniform thickness and with a level surface. This arrangement of the liquid albumen in separated small quantities of uniform size and thickness permits a uniform application of the air currents to the liquid for evaporating purposes, and the process may thus be performed with uniformity throughout the entire interior of the drying-house.

The parts of the drying-house are preferably manufactured in standard parts in order that the parts may be stored or shipped with convenience, and with equal facility the parts may be assembled and the house erected and leveled, for the efficient performance of its functions.

Having thus fully described my invention, what I claim as new and desire to secure by Letters Patent is:

1. The combination in a drying-house having a roof, doors at the opposite sides of the house, and upright up-draft flues adjacent the doors, of a pair of spaced, central ported partitions extending from end to end of the house and forming a main flue having an inlet, a compartment at each side of the flue, a ceiling covering said main flue and compartments, said ceiling and roof forming an outlet chamber to receive currents of air from the up-draft flues, each said compartment having a vertical tier of horizontally slidable trays forming evaporating spaces between the main flue and the respective up-draft flues, and means for controlling communication of air currents through the ported partitions.

2. The combination in a drying-house having a roof, a ceiling below the roof forming an outlet chamber and an outlet pipe to the chamber, exterior doors at the opposite sides of the house, and said house having interior up-draft flues adjacent the doors and opening to said chamber, of a pair of spaced, central ported partitions extending from end to end of the house and formings a central main flue and spaced tray-compartments, said main flue and compartments being separated from the outlet chamber by said ceiling, ported-slides co-acting with the ported partitions to control movement of air currents from the main flue through the ported partitions and means for operating the slides, and each said compartment having a vertical tier of horizontally slidable trays forming evaporating spaces between the main flue and the up-draft flues.

ROY A. GOODHUE.